Oct. 10, 1967  G. J. PAILLOZ  3,346,215
PERFORATED TAPE CONTROL SYSTEM FOR LOW ALTITUDE TARGETS
AND TARGET MISSILES
Filed Oct. 12, 1965

George J. Pailloz,
INVENTOR.

BY Harry M. Saragovitz
Edward J. Kelly
Herbert Berl
Robert C. Sims

United States Patent Office 3,346,215
Patented Oct. 10, 1967

3,346,215
PERFORATED TAPE CONTROL SYSTEM FOR LOW ALTITUDE TARGETS AND TARGET MISSILES
George J. Pailloz, Huntsville, Ala., assignor to the United States of America as represented by the Secretary of the Army
Filed Oct. 12, 1965, Ser. No. 495,360
8 Claims. (Cl. 244—3.15)

The invention described herein may be manufactured and used by or for the Government for governmental purposes without the payment of any royalty thereon.

This invention relates generally to a low altitude control system for targets and target missiles and more specifically this invention relates to an inexpensive low altitude control system for subsonic, sonic and supersonic target missiles operating out of visual sight or below radar mask.

Due to the high speed target missiles in use today and the greater speeds to be encountered in the future, control at low altitudes and at a minimum cost is a problem. The only apparent method that is known at present is radar sensing, which in addition to being expensive, is heavy in weight. The mere function of a target prohibits the use of costly components and control systems. Where possible, the pay load is limited because of the cost involved in providing adequate space, and in turn, for larger and heavier power plants capable of attaining higher speeds.

A good low altitude control system must predict changes in terrain features well in advance so that corrections in the flight path of the target missile can be made in time and without extreme sharp maneuvers. Since the target missile is normally out of visual sight and masked from radar tracking stations, flight control must be programmed.

It is therefore an object of this invention to provide a control system for low altitude target missiles out of visual sight.

Another object of this invention is to provide a control for low altitude target missiles which are masked from radar tracking.

Further, it is an object of this invention to provide an inexpensive low altitude control system for subsonic, sonic, and supersonic target missiles.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention in which:

In order to better understand the operation of the system described in the figures, a description of its components referred to is first presented.

Figure 1:
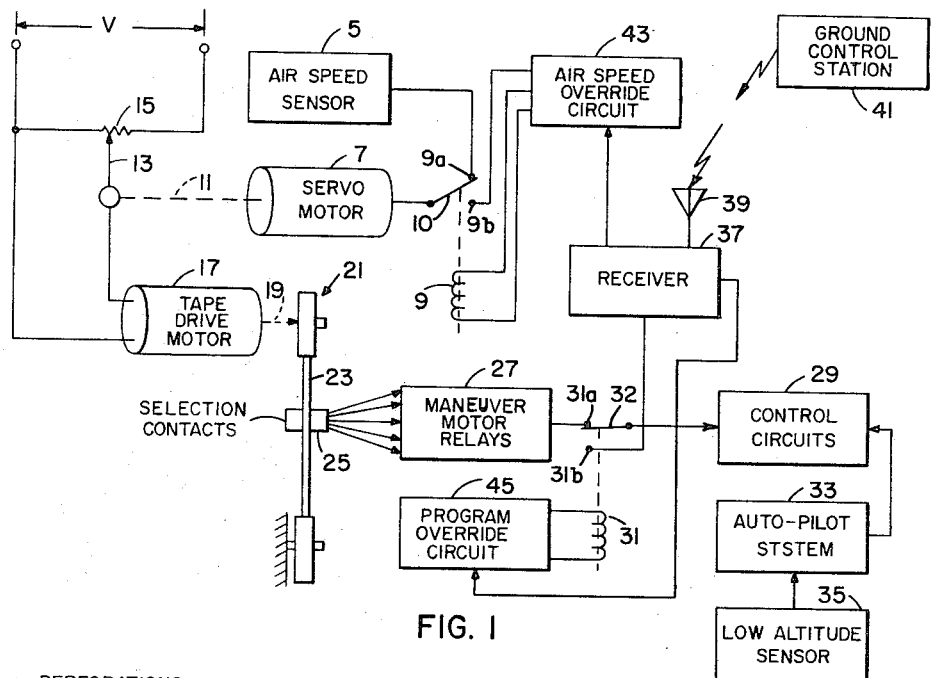
FIGURE 1 is a block diagram illustration of a low altitude control system for target missiles according to the present invention.
Figure 2:
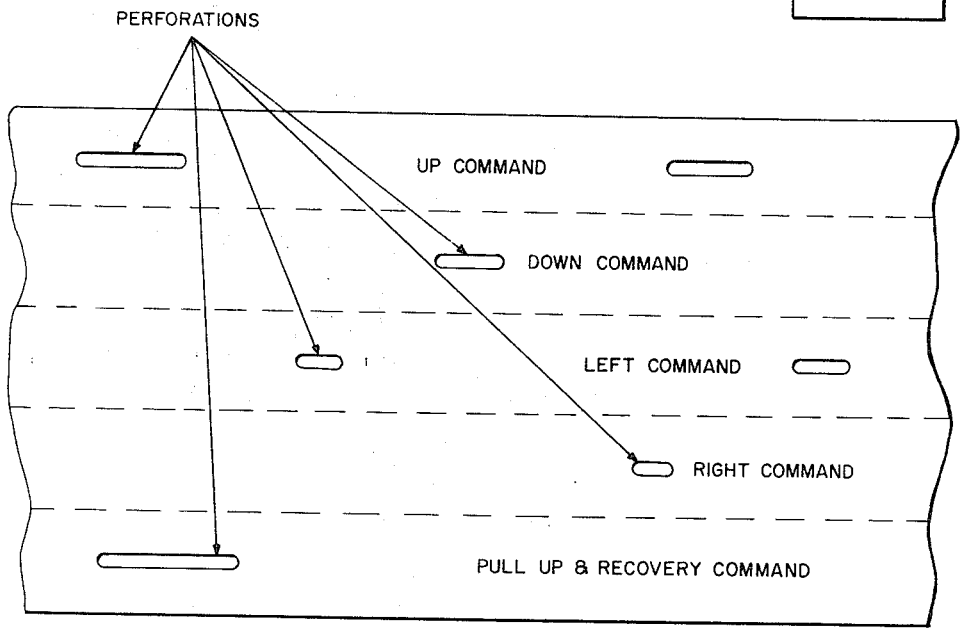
FIGURE 2 illustrates a program tape which is used in a program control device of this invention.

Referring now to FIGURE 1, there is shown a control system for low altitude targets and target missiles according to the present invention. An air speed sensor 5 is provided for indicating the air speed and producing an electrical output indicative of the air speed of the missile or aircraft within which it is mounted. The electrical output of sensor 5 is connected to servo motor 7 through a set of normally closed contacts 9a and arm 10 of relay 9. An output shaft 11 of motor 7 is connected to an adjustable contact 13 of potentiometer 15 which varies the output voltage of potentiometer 15 responsive to the speed of the target. The potentiometer 15 is connected across a voltage supply V. The output of potentiometer 15 is connected to a tape drive motor 17. Output shaft 19 of motor 17 is connected to a tape drive mechanism 21. A perforated tape 23, a portion of which is shown in FIGURE 2, is placed on the tape drive 21. The tape will be described later in the specification. The tape 23 is made to pass over selection contacts 25 which are energized by programmed perforations in tape 23. Contacts 25 are electrically connected to maneuver motor relays 27. This unit contains a number of relays, each with a specific function i.e., up, down, right, left, pull-up recovery commands, etc. The output of the selected relay is fed into control circuits 29 through a set of normally closed contacts 31a and arm 32 of relay 31. An auto-pilot system 33 is connected to control circuit 29 for keeping the target missile in the proper flight path after maneuvers have been made. The output of a low altitude sensor 35 is connected to the auto-pilot system 33 which, in turn, will maintain the target above a desired altitude which is set prior to launch.

A receiver 37 having an antenna 39 for radio connection to a ground control station 41 is provided for ground control of the target if necessary. The receiver 37 has an output connected to control circuits 29 through a set of normally open contacts 31b and arm 32 of relay 31. A second output of receiver 37 is connected to an air speed override circuit 43 which actuates relay 9 and has an output connected to servo motor 7 through a set of normally open contacts 9b and arm 10 of relay 9. Air speed override circuit 43 is placed in operation through normal receiver command control channels activated from the ground control station 41. The purpose of this circuit is to temporarily override the air speed sensing circuit to compensate for any unpredicted prevailing winds (head wind or tail wind) by varying the speed of tape drive motor 17. Also, provided is a program override circuit 45, actuated upon command from ground control station 41, which picks up relay 31 and connects receiver 37 to control circuits 29 for full control of the target missile by the ground control station 41 overriding the programmed control.

Referring now to FIGURE 2, there is shown a portion of the tape 23 with examples of perforations and the function of each of the five channels. The length of each perforation will determine the length of time control will be held in certain attitude. At the end of each control action, the target will be returned to straight and level flight by the auto-pilot system 33. The length and frequency of perforations is determined by the terrain features of flight area and the normal speed of the target missile in which the system is being used.

It will, of course, be necessary to have a different tape for each type of target missile. However, the same tape may be used for an indefinite period of time and on more than one type target missile if the flight path and target missile speed are the same.

Tapes may be precut and identified to accommodate any peculiar terrain, speed, climatic or atmospheric condition or conditions. An appropriate tape may be installed at the last moment depending on the flight requirements.

This system is not intended to maintain pin-point accuracy in the altitude of the target missile with respect to the ground. It's purpose is to make only those corrections necessary to permit the target to clear any outstanding obstacles in the flight path and program the entire flight as required.

The accuracy of the system will depend on the proper relationship between the terrain map contour lines, missile ground speed and the perforations placed on the program tape. Corrections required to allow for unpredicted prevailing winds can be made with the air speed override circuit at any time during flight.

In the event it is desired to terminate programmed flight and place the target under command control from the ground control station 41, the program override circuit can be activated from the ground control station.

The incorporation of an adjustable barometric minimum altitude sensing device will maintain a minimum target altitude over the lowest terrain encountered in the flight path. All computations for programming will use this altitude as a reference point.

With the exception of the altitude sensor 35 and air speed sensor 5, all of the program contact units can be incorporated into a single box of nominal size and weight thus making the flight control system according to the present invention of tremendous advantage over presently used flight control systems.

While the invention has been described with reference to a preferred embodiment thereof, it will be apparent that various modifications and other embodiments thereof will occur to those skilled in the art within the scope of the invention. Accordingly, I desire the scope of my invention to be limited only by the appended claims.

I claim:

1. A control system for targets and target missiles comprising: an air speed sensing means for supplying signals responsive to the speed of said missile; motor control means connected to an output of said air speed sensing means for providing a variable supply voltage output responsive to said air speed sensing means; motor means connected to said variable supply voltage output having variable speeds responsive to said variable supply; program means connected to said motor means for providing flight control of said missile at a rate responsive to said motor means; maneuver control means connected to said program means for providing control signals responsive to said program means; and control means connected to said maneuver control means for providing control of the flight path of said target missile.

2. A control system for targets and target missiles as set forth in claim 1 wherein said motor control means comprises: a potentiometer having a wiper output connected to said motor means; a servo motor responsive to the signal output of said speed sensing means; said motor having its output shaft connected to said wiper of said potentiometer.

3. A control system for targets and target missiles as set forth in claim 2 wherein said motor means is a variable speed motor responsive to the output of said potentiometer.

4. A control system for targets and target missiles as set forth in claim 3 wherein said program means comprises: a perforated tape for producing command signals coincident with a terrain map of the area of flight; a tape drive coupled to said variable speed motor; and tape selection circuits for providing maneuver command signals by selecting bits of information from said tape.

5. A control system for targets and target missiles as set forth in claim 1 further comprising an air speed override means for providing overriding signals to said motor control means for corrections in target missile flight path during flight; a receiver means; a ground control station; and said override means being connected to said receiver means for receiving command signals from said ground control station.

6. A control system for targets and target missiles as set forth in claim 5 wherein said air speed override means further comprises a relay having contacts connected to said motor control means, said air speed sensing means, and said receiver means for selectively disconnecting said air speed sensor means from said motor control means and connecting said air speed override means to said motor control means.

7. A control system for targets and target missiles as set forth in claim 1 further comprising a program override means for disconnecting said control signals and providing signals to said control means from a ground control station.

8. A control system for targets and target missiles as set forth in claim 7 wherein said program override means further comprises a receiver; and a relay having contacts connected to said maneuver control means, said control means, and said receiver for selectively disconnecting said maneuver control means from said control means and connecting said cotnrol means to said receiver for control of said target missile from a ground control station.

References Cited

UNITED STATES PATENTS

| | | | |
|---|---|---|---|
| 2,362,827 | 11/1944 | Joachim | 178—111 X |
| 2,814,199 | 11/1957 | Waldorf et al. | |
| 3,071,765 | 1/1963 | Schutz | 244—3.17 X |

RICHARD A. FARLEY, *Primary Examiner.*

BENJAMIN A. BORCHELT, RODNEY D. BENNETT, *Examiners.*

M. F. HUBLER, *Assistant Examiner.*